United States Patent
Perfahl et al.

(10) Patent No.: US 12,251,774 B2
(45) Date of Patent: Mar. 18, 2025

(54) DEVICE FOR PROCESS MONITORING IN A DEPOSITION WELDING METHOD

(71) Applicant: SAUER GmbH, Stipshausen (DE)

(72) Inventors: Holger Perfahl, Steinheim (DE); Christian Kledwig, Kempten (DE)

(73) Assignee: SAUER GmbH, Stipshausen (DE)

( * ) Notice: Subject to any disclaimer, the term of this patent is extended or adjusted under 35 U.S.C. 154(b) by 135 days.

(21) Appl. No.: 18/174,772

(22) Filed: Feb. 27, 2023

(65) Prior Publication Data

US 2023/0219165 A1 Jul. 13, 2023

Related U.S. Application Data

(62) Division of application No. 16/308,436, filed as application No. PCT/EP2017/064523 on Jun. 14, 2017, now Pat. No. 11,618,099.

(30) Foreign Application Priority Data

Jun. 30, 2016 (DE) ...................... 10 2016 211 935.4

(51) Int. Cl.
*B23K 26/03* (2006.01)
*B23K 26/342* (2014.01)

(52) U.S. Cl.
CPC .......... *B23K 26/034* (2013.01); *B23K 26/342* (2015.10)

(58) Field of Classification Search
CPC ........ B23K 26/00; B23K 26/20; B23K 15/00; B23K 15/02; B23K 26/02; B23K 26/03;
(Continued)

(56) References Cited

U.S. PATENT DOCUMENTS

| 5,532,452 A | 7/1996 | Lechner et al. |
| 5,721,415 A | 2/1998 | Fortmann et al. |

(Continued)

FOREIGN PATENT DOCUMENTS

| CN | 104136149 A | 11/2014 |
| DE | 10 2004051876 A1 | 4/2006 |

(Continued)

OTHER PUBLICATIONS

International Search Report dated Oct. 25, 2017 for PCT App. Ser. No. PCT/EP2017/064523.
(Continued)

*Primary Examiner* — Vy T Nguyen
(74) *Attorney, Agent, or Firm* — Henricks Slavin LLP

(57) ABSTRACT

The invention relates to a device and a method for process monitoring in a deposition welding method. The object of the invention is to provide a device in which the process monitoring in a deposition welding method is further optimized, and process deviations that can affect the quality of a product are reliably avoided. Surprisingly, the devices known in the state of the art for process monitoring in deposition welding can be developed to a substantially optimized process monitoring, in which said devices are supplemented by equipment for detecting a time period during which the detected surface region is greater than a predetermined minimum value, and equipment for discontinuing the deposition welding process in an automated manner in the event that the time period of the detected surface region is greater than a predetermined time value.

16 Claims, 6 Drawing Sheets

Figure 1:
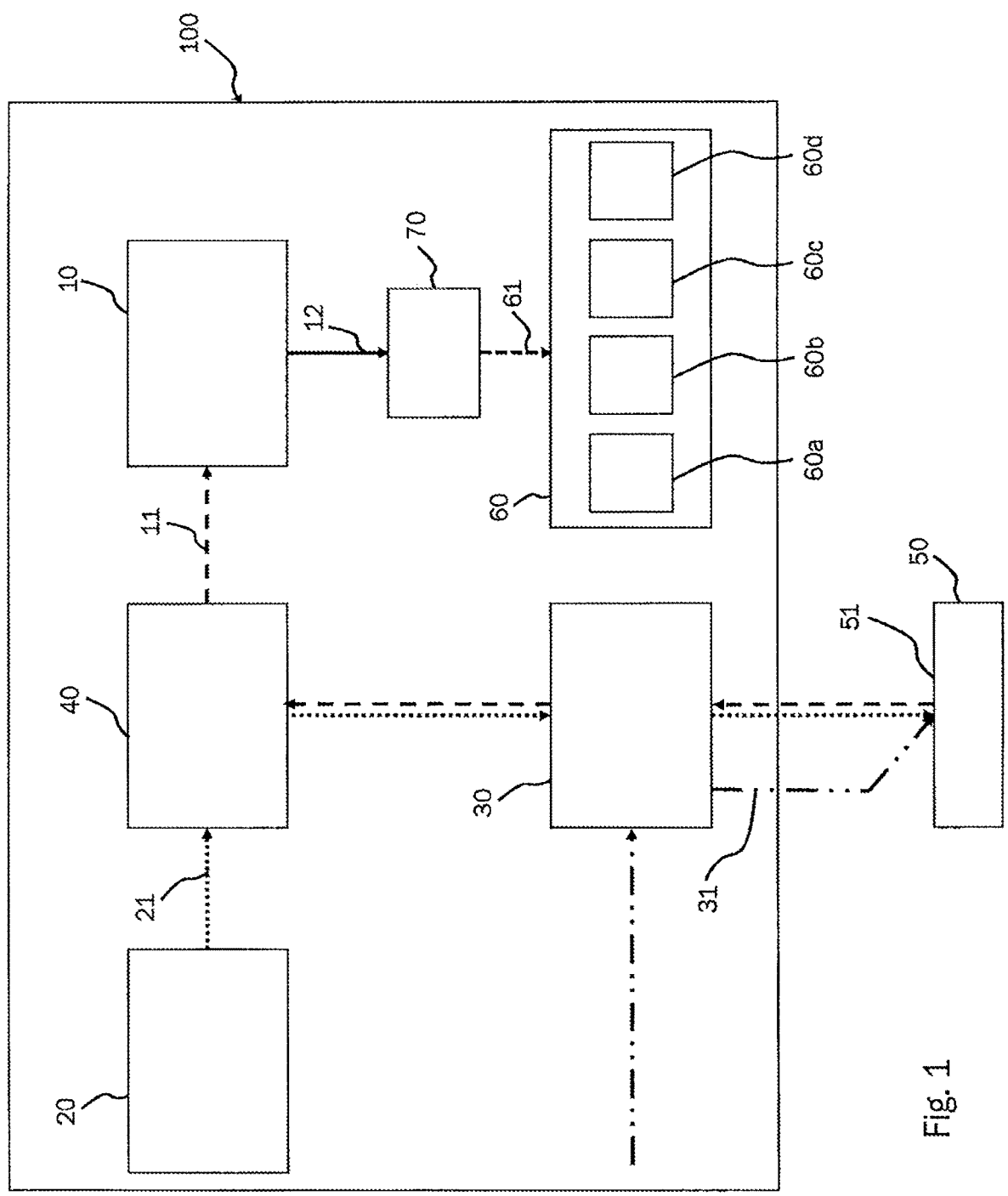

(58) Field of Classification Search
CPC ......... B28B 17/00; B28B 1/00; B29C 64/153;
B29C 64/20; B33Y 10/00; B33Y 30/00;
B33Y 50/02; G01B 9/02; G01N 21/45;
G01N 21/84
USPC ............ 219/121.63, 121.45, 121.46, 121.64,
219/121.65, 121.66, 121.83; 700/118,
700/119, 166
See application file for complete search history.

(56) References Cited

U.S. PATENT DOCUMENTS

| | | | |
|---|---|---|---|
| 6,423,926 | B1 | 7/2002 | Kelly |
| 6,940,037 | B1 | 9/2005 | Kovacevic et al. |
| 7,020,539 | B1 * | 3/2006 | Kovacevic ............ B22F 10/66 700/98 |
| 8,456,523 | B2 | 6/2013 | Stork genannt Wersborg |
| 8,476,590 | B2 | 7/2013 | Stratmann et al. |
| 10,315,283 | B2 | 6/2019 | Murota |
| 2004/0133298 | A1 | 7/2004 | Toyserkani |
| 2005/0218120 | A1 * | 10/2005 | Shih ................... B23K 11/257 219/110 |
| 2006/0011592 | A1 | 1/2006 | Wang et al. |
| 2008/0296270 | A1 | 12/2008 | Song et al. |
| 2008/0314887 | A1 | 12/2008 | Stoger et al. |
| 2012/0285936 | A1 | 11/2012 | Urashima et al. |
| 2013/0319980 | A1 | 12/2013 | Hesse et al. |
| 2014/0175071 | A1 | 6/2014 | Pfitzner et al. |
| 2015/0064048 | A1 | 3/2015 | Bessac et al. |
| 2015/0262387 | A1 | 9/2015 | Zebaze et al. |
| 2015/0268099 | A1 | 9/2015 | Craig et al. |
| 2015/0377263 | A1 | 12/2015 | Dupuis et al. |
| 2016/0151859 | A1 | 6/2016 | Sparks |
| 2018/0133840 | A1 | 5/2018 | Noriyama et al. |

FOREIGN PATENT DOCUMENTS

| | | |
|---|---|---|
| DE | 10 2007032190 A1 | 1/2009 |
| DE | 10 2007056984 A1 | 5/2009 |
| DE | 10 2012221218 A1 | 5/2013 |
| DE | 10 2012216928 A1 | 3/2014 |
| DE | 10 2014214939 A1 | 3/2016 |
| DE | 10 2016206546 A1 | 10/2017 |
| EP | 1600247 A2 | 11/2005 |
| WO | WO 2016032953 A1 | 3/2016 |

OTHER PUBLICATIONS

Office Action dated Jun. 17, 2020 in corresponding CN App. Ser. No. 201780040345.1.

English language summary of Office Action dated Jun. 17, 2020 in corresponding CN App. Ser. No. 201780040345.1.

* cited by examiner

DEVICE FOR PROCESS MONITORING IN A DEPOSITION WELDING METHOD

CROSS-REFERENCE TO RELATED APPLICATIONS

This application is a divisional of application Ser. No. 16/308,436, filed Dec. 7, 2018, now U.S. Pat. No. 11,618, 099, which is the U.S. National Stage of PCT application Ser. No. PCT/EP2017/064523, filed Jun. 14, 2017, each of which is incorporated herein by reference in its entirety.

The invention relates to device for process monitoring in a deposition welding method according to the preamble of claim 1 and a method for process monitoring in a deposition welding method according to the preamble of claim 5.

In the field of additive manufacturing individual layers all the way to 3D structures, among other things, laser-powder deposition welding is used among other things, which pertains to the deposition welding manufacturing method (or also referred to as cladding). Thereby, a melting of the workpiece surface takes place on a workpiece by means of localized heat exposure while simultaneously applying almost any type of metallic material. Thereby, nowadays, a high-performance diode laser or fiber laser is primarily used as a heat source.

In order to obtain the desired quality and surface characteristic, a continuous process monitoring is required. Using a camera system, which is optically directed onto the point where melting occurs, an image of the region to be monitored can be generated. Thereby, as a general rule, temperature values and temperature intensities are generated by the point where melting occurs, which can be used later on for monitoring and controlling the process.

A device to carry out the surface treatment of a workpiece surface by applying heat is known from DE 10 2007 032 190 A1. Thereby, the effective range of processing is converted into image signals and then, processed into control signals in order to control the heating effect on the surface of the workpiece depending on the state of the effective range of the heat. The control signals cause the actuation of one or a plurality of actuators to change the heating effect. Thereby, for the processing of the image signals, a pixel-by-pixel analysis is used where the image appears based on the grey-shade gradients, which is divided into a heat zone with a higher heat and a heat zone with a lower heat. The evaluation of the progression and quality of the process thereby takes place only based on the pixel-by-pixel comparison of the region size of these two heat zones with each other.

From DE 10 2004 051 876 A1, an arrangement for the locally resolved temperature measurement for a laser processing method is known. Thereby, a specifiable processing region of a workpiece can be depicted on an optical detector measuring in a locally resolved manner. Furthermore, an optical filter is arranged in the beam path between the processing region and the optical detector, which blocks the electromagnetic radiation of one or a plurality of laser processing beam(s). The captured image of the detector can be used for the determination of the temperature distribution of the processing region, among other things. For the evaluation of the captured image, only the shape and the position of a region are taken into account, which exceeds a specified maximum temperature value.

US 2008/0296270 A1 discloses a real-time control system of a deposition welding process where the temperature is monitored by means of a pyrometer and the shape of the molten pool is monitored by means of a camera.

From U.S. Pat. No. 6,423,926 B1, a method is known where the temperature of a nozzle is monitored during a laser deposition welding method by means of thermal elements that are arranged within a process head.

U.S. Pat. No. 6,940,037 B1 discloses a control system for a deposition welding process where the welding parameters are adjusted based on cladding points and the determination of a geometric factor.

EP 1 600 247 A2 shows a device for monitoring a nozzle of a laser-beam machine, wherein the device is arranged separately from a process head for monitoring and uses a CCD camera for the optical monitoring of a nozzle.

From US 2004/0133298 A1, a device is known where a laser deposition welding method controls the cladding process by means of optically detecting the roughness, the cladding dimensions and the hardening speed of the deposited material.

The object of the invention is to provide a device in which the process monitoring in a deposition welding method is further optimized, and process deviations that can affect the quality of a product are reliably avoided.

The task is achieved by means of a device for process monitoring in a deposition welding method according to claim 1 and by means of a method for process monitoring in a deposition welding method according to claim 5.

Favorable embodiments and further embodiments of the invention can be achieved by means of the features referred to in the subclaims.

The device according to the invention for process monitoring in a deposition welding method comprises an optical detector, which is optically integrated within a beam path of a laser beam, wherein the laser beam is emitted by a laser-beam source in a directed manner to melt a material to be deposited, is guided onto a workpiece via an optical system and, thereby, focused onto a surface of the workpiece to be processed, and the optical system is set up to send a detector signal depending on the temperature of the workpiece and the nozzle geometry in the direction opposing the laser beam to an optical detector, which is captured by the optical detector and converted into an electrical detector signal, comprises a conversion unit, which converts the electrical detector signal into an image, which reproduces the temperature-dependent intensity distribution of the detector signal captured by the optical detector, and comprises an evaluation unit, which is set up to further process the image, wherein the evaluation unit furthermore comprises the following for this purpose: equipment to determine a monitoring region of the image, a device for the repeated detection of a surface region of the monitoring region, in which the intensity exceeds a specified minimum value, a device to detect a time period, during which the detected surface region greater than a specified minimum value, and a device to discontinue the deposition welding process if the time period of the detected surface region is greater than a specified time value.

Surprisingly, the devices described in the above and known in the state of the art for process monitoring in deposition welding can be developed to a substantially optimized process monitoring, in which said devices are supplemented by equipment for detecting a time period during which the detected surface region is greater than a predetermined minimum value, and equipment for discontinuing the deposition welding process in an automated manner in the event that the time period of the detected surface region is greater than a predetermined time value.

This is based on the circumstance that the inventors have recognized that, in this way, a device can be created, which makes it possible to detect nozzle adhesive substance residues from the deposition welding process in a reliable and timely manner during their occurrence.

Such adhesive substance residues can occur if, during the deposition welding process, powder already begins to melt at the outlet opening of a nozzle for the supply of powder, and spreads in the direction of the passage opening of the laser beam over time and limit this or enclosed gas bubbles are freed within the workpiece and, by means of this, material melted on the workpiece spurts away and it adheres to the edge of the passage opening of the laser beam. The problem with such adhesive substance residues is that, while projecting into the passage of the laser beam, this results in limiting the laser beam (meaning less energy application onto the workpiece than is planned) or in the reflection of this within the nozzle, which, in turn, can result in excessive heating of the nozzle. In addition, the adhesive substance residue can form at the outlet opening of the powdery material of the nozzle and strongly influence the focusing of the powdery material.

In order to detect a possible fault in the focusing of the powder cone as early as possible, a constant process monitoring is required. It permits for the timely detection of any change, no matter how small it is, with regard to the adhesive substance residue of molten material, which stabilizes the quality of the product significantly.

The invention thereby creates a device, by means of which such adhesive substance residues can be reliably detected and furthermore ensures that, in the case of detecting a continuous adhesive substance residue of dirt at the nozzle opening, the process is automatically ended.

The device according to the invention can be favorably further developed in such a way that the monitoring region is an annular edge region along the inner circumference of the nozzle opening (nozzle edge), which is particularly favorable for the detection of adhesive substance residues, which can typically form on the nozzle edge.

By means of this, it can be ensured that nozzle adhesive substance residues, which can form on the edge of the nozzle, are reliably detected by the device.

The device according to the invention can be favorably further developed in such a way that the equipment is set up to discontinue the deposition welding process in order to discontinue the process of deposition welding in an automated manner if the time period of the detected surface region is greater than a specified time value.

By means of an automated process, a quick response can be taken for any changes in the monitoring region and, if required, the process can be stopped in a timely manner if the optical detection of the adhesive substance residues exceeds the previously determined limit values. This increases the reliability of the process sequence.

The device according to the invention can additionally be favorably further developed in such a way that the material to be deposited is guided via the nozzle, thereby focusing on the surface of the workpiece to be processed.

By means of this, the material, which should be deposited onto the workpiece, can be guided into the focus of the laser beam in a selective manner, where it connects to the base material of the workpiece which has already been molten. Furthermore, such a focused supply is favorable since increasingly smaller structures can be created by means of an increased focusing of the powdery material.

The device according to the invention can be favorably further developed in such a way that the laser beam is guided through a middle region of the nozzle onto the surface of the workpiece to be processed.

The advantage of this further embodiment lies in that the laser beam is within the cone, which forms from the supply of the powdery material to be deposited, thereby the material cone and the laser beam are able to lie close to one another. That has the advantage that the process head, which is moved over the workpiece and deposits the material on this, can be relative compact, which is of a particular advantage for the creation of structures in regions that are difficult to reach.

The device according to the invention can be favorably designed in such a way that the device is set up in such a way that a minimum size of the monitoring region is 20%, preferably at least 30%, being particularly preferred at least 40%, however a maximum of 70% relative to an overall region, consisting of the monitoring region.

Furthermore, the device is particularly favorably set up in such a way that the specified minimum value for the detection of a time period is 10%, preferably 15%, being particularly preferred 20% relative to the range of the monitoring region.

By means of this, different geometries of the nozzle can be taken into consideration and the device can be adapted to the deposition welding concerning the respective process parameters and requirements (such as quality of the weld, etc.).

The invention also comprises a method according to the invention for process monitoring in a deposition welding method under the use of an optical overall system with an optical detector, which is integrated within a beam path of a laser beam, and with a laser-beam source, which emits the laser beam from a laser-beam source in a directed manner to melt material to be deposited, guides it on to a workpiece via an optical system, thereby focusing it on to a surface of the workpiece to be processed, and the optical system is set up to send a detector signal depending on the temperature of the workpiece and the nozzle geometry in the opposing direction of the laser beam to an optical detector, which is captured by the optical detector and converted into an electrical detector signal, and with a conversion unit, which converts the electrical detector signal into an image, which reproduces the temperature-dependent intensity distribution of the detector signal captured by the optical detector, wherein the method comprises the following steps: Determination of the monitoring region of the image, repeated detection of a surface region of the monitoring region, in which the intensity exceeds a specified minimum value, detection of the time zone, during which the detected surface region is greater than a specified minimum value and discontinuing the process of the deposition welding if the time period of the detected surface region is greater than a specified time value.

The invention divides the captured image of the intensities of the processing region into a plurality of regions in such a way that at least one region is suitable for the monitoring of the nozzle adhesive substance residue and monitors the previously determined limit value for the region size, intensity and time the region size exists. If these limit value are exceeded in a certain sequence, the process is discontinued.

The method according to the invention can be favorably further developed in such a way that the monitoring region is determined as an annular edge region around the process region (nozzle edge) for the detection of adhesive substance residues.

By means of this, it can be ensured that adhesive substance residues of the nozzle, which can form on the edge of the nozzle, can be reliably detected by the method.

The method according to the invention can be favorably further developed in such a way that the time period is preferably one second, three seconds or, being particularly preferred five seconds.

Thereby, the process monitoring can be given enough time to react to the changes within the monitoring region. Thereby, it is of great importance to select the time in such a way that the process is discontinued to quickly since, in the case of changes in the image of the monitoring region, it can also only have to do with changes at short notice. In turn, this would not be mandatorily indicate an adhesive substance residue on the nozzle edge and the process could be continued.

The method according to the invention can be favorably further developed in such a way that a minimum size of the monitoring region is at least 20%, preferred at least 30%, being particularly preferred at least 40%, however, a maximum of 70% relative to the overall region consisting of the monitoring region and the process region.

By means of this, different shapes and diameters of the opening of the nozzle can be taken into consideration, just like other factors, which are crucial for image processing (e.g. image scale, pixel number, etc.)

The method according to the invention can be favorably further developed in such a way that the specified minimum value for the detection of the time period is a maximum of 10%, preferably a maximum of 15%, being particularly preferred a maximum of 20% relative to the minimum range of the monitoring region.

By means of this, the method can be applied to different nozzles/nozzle geometries and furthermore, the method can be adapted to the deposition welding concerning the respective process parameters and requirements (such as quality of the weld, etc.).

Figure 1A:
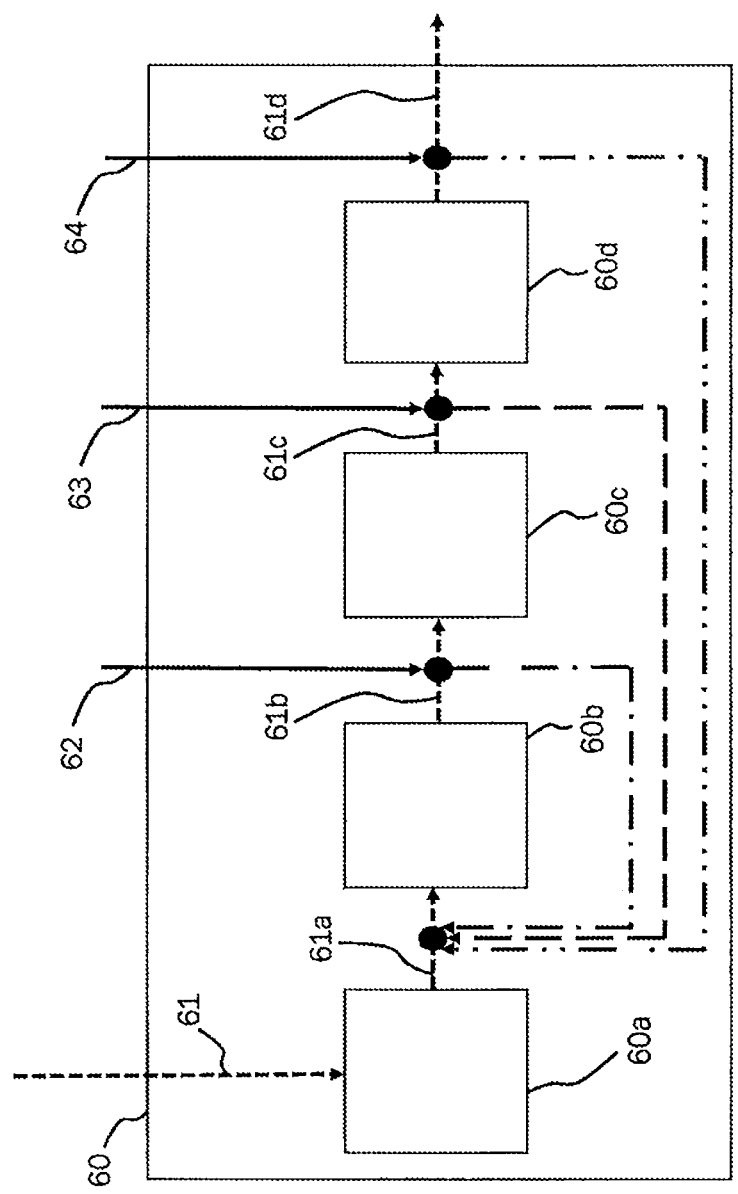
Figure 1B:
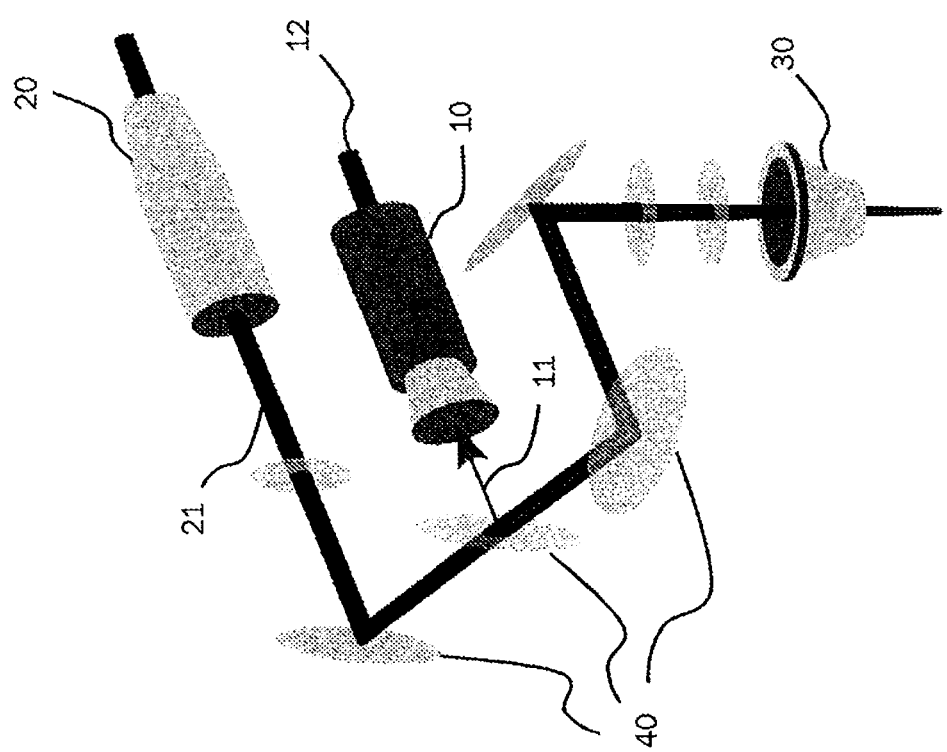

The invention is now explained in more detail based on the exemplary embodiments. The figures show:

FIG. 1: a diagram of a device according to the invention for process monitoring in a deposition welding method, FIG. 1a: a detailed diagram of the evaluation unit of the device according to the invention for the process monitoring for a deposition welding method according to FIG. 1, FIG. 1b: a beam path of the device according to the invention for the process monitoring for a deposition welding method according to FIG. 1.

Figure 2:
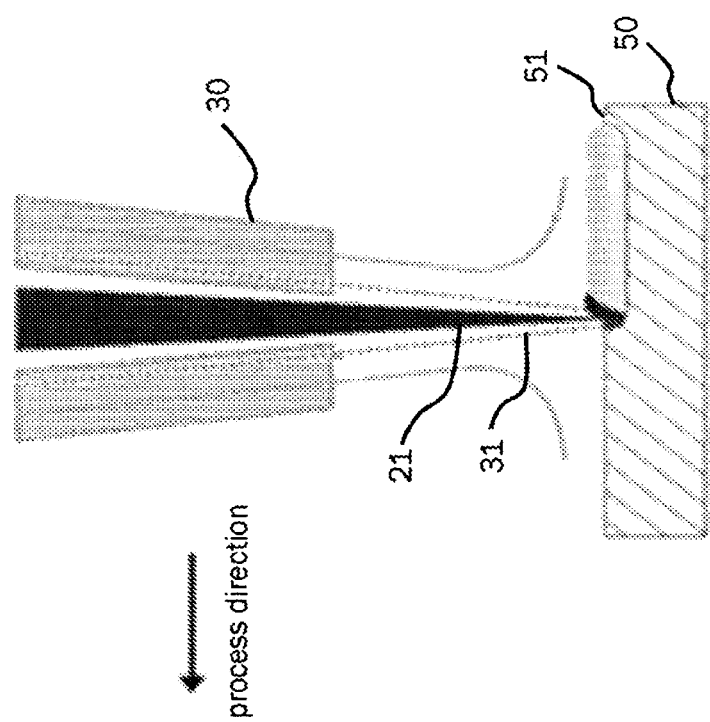

FIG. 2: Cross section of a nozzle with a laser beam passing through and supply of the material to be applied.

Figure 3:
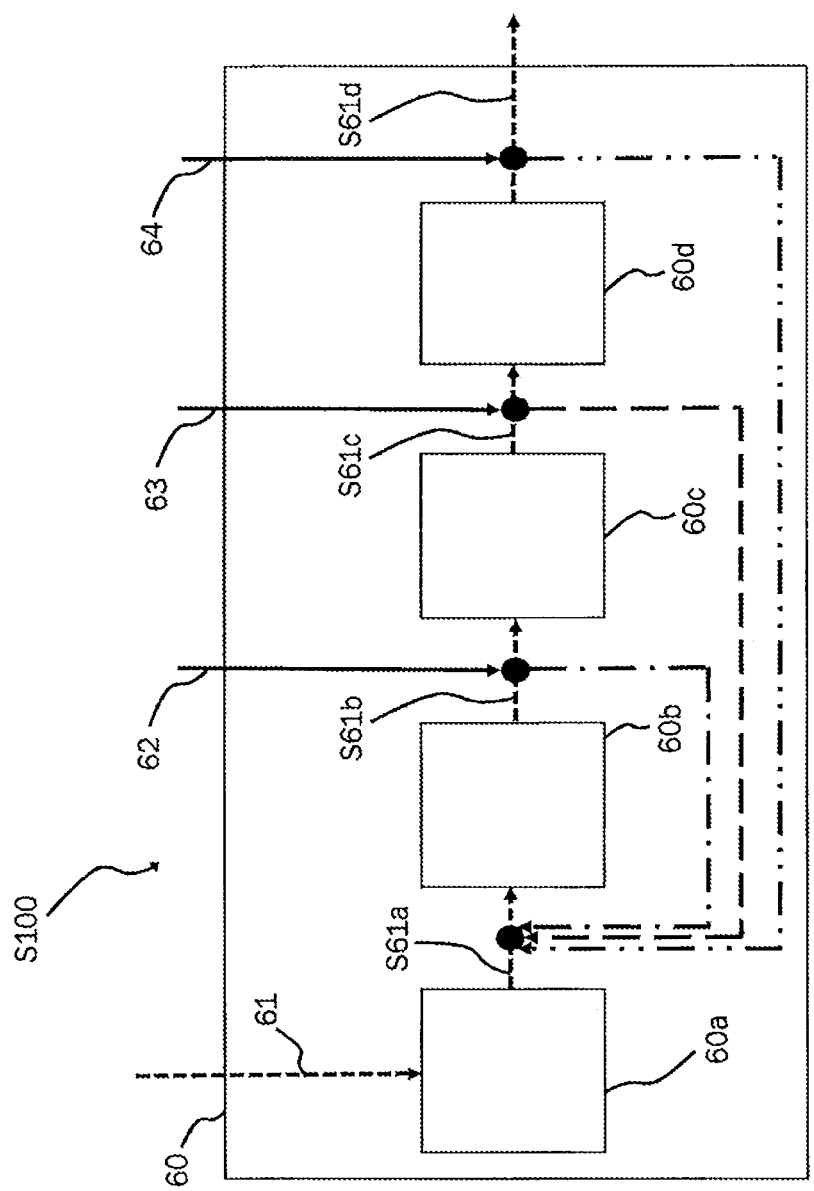
Figure 4:
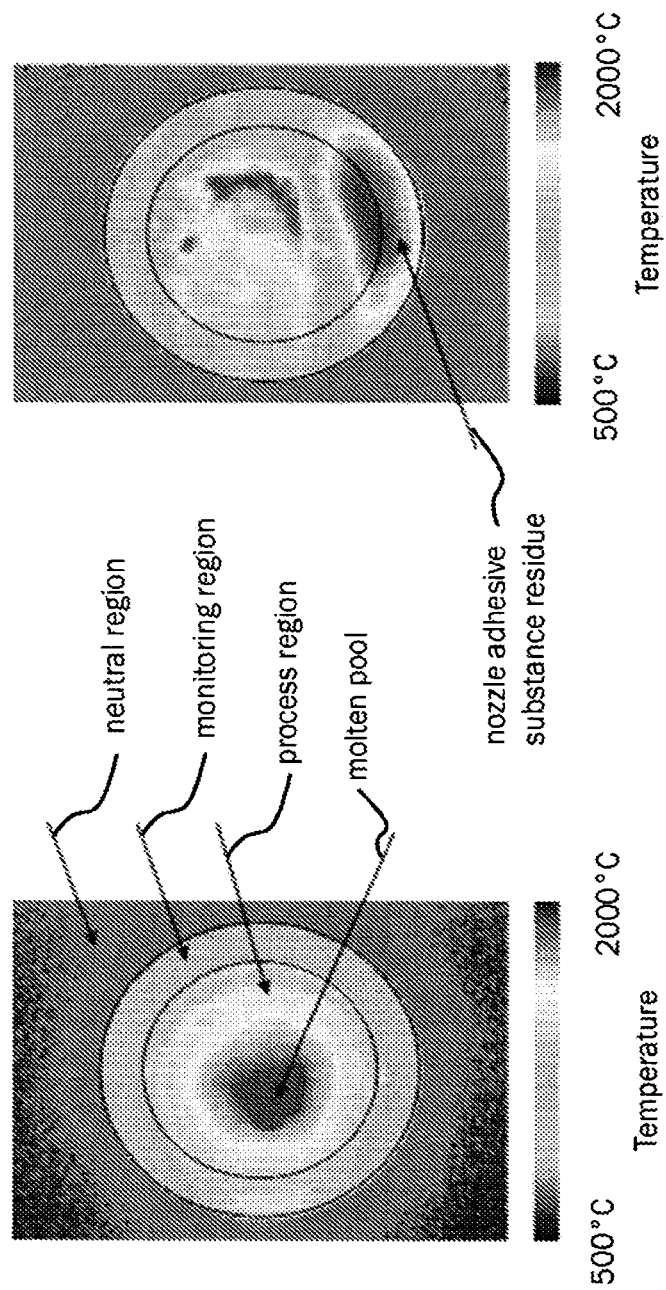

FIG. 3: a diagram of a method according to the invention for process monitoring in a deposition welding method, FIG. 4: detected image of a deposition welding process with a determined monitoring region (left) according to the invention and the same with an additionally recognizable adhesive substance residue to the nozzle (right).

FIG. 1 shows a schematic illustration of an exemplary embodiment of the device 100 for the process monitoring in a deposition welding method with an optical detector 10, which is optically integrated in a beam path of a laser beam 21. Favorably, this can take place via a beam splitter as can be seen in FIG. 1b, which is designed as a beam splitter cube or a semipermeable mirror. By mean of this arrangement, the laser beam 21, which is guided from the laser-beam source 20 to the workpiece 50, and, by means of this, material to be deposited 31 can be melted, superimposed with a detector signal 11, which is set by the surface 51 to be processed in an opposing direction to the laser beam 21 to an optical detector 10. However, other embodiments are also possible, by means of which the laser beam and the detector signal can be superimposed.

An optical sensor chip is used as a detector 10, which can detect infrared wavelengths. They form the basis for the generation of an image 61 with temperature-dependent intensities. For this purpose, in principle, cameras with a CCD or a CMOS sensor are used. They convert the captured detector signal 11 into an electrical detector signal 12, which is sent to an evaluation unit 60.

In the conversion unit 70 itself, the electrical detector signal 12 can be converted into the image 61 with the temperature-dependent intensities and sent to the integrated equipment 60a, 60b, 60c, 60d of the evaluation unit 60 for further processing.

Such an image 61 can be roughly divided into three regions, which can be recognized particularly well in FIG. 4.

The first region is the process region. Here, particularly high intensities (high temperatures) can be expected in the image 61 since, here, the laser beam 21 hits the surface 51 of the workpiece 50 and thereby, a particularly higher heat application occurs. This region can be recognized in FIG. 4 as the most inward region. This is not used for the evaluation of the monitoring after adhesive substance residues of the nozzles.

The second region is the monitoring region, which is determined by the equipment 60a, as will be explained later on in more detail, and used for the later evaluation with regard to the monitoring of the nozzle adhesive substance residues. This region extends on the outer edge of the process region in an annular way, as selected in this exemplary embodiment in FIG. 4. Expressed in other words, this means that the process region can be juxtaposed with the nozzle opening and therefore, the monitoring region extends along the edge of the nozzle opening. Here, as a rule, only average intensities (average temperature values) should be expected since, naturally, the heat, which is input by the laser beam 21 into the workpiece 50, spreads within the material due to heat conduction, among other things.

The third region is the neutral region. This region comprises everything except the first and the second region, as is shown in FIG. 4. Here, except for a few artefacts, which arise, for example, from the reflect of the nozzle inner surface, comparably low intensities (low temperatures) are to be expected. Like the first monitoring region, this region is excluded from the monitoring with regard to adhesive substance residues of the nozzle.

FIG. 1a shows a detailed diagram of the evaluation unit according to the invention, the equipment of which should be explained in more detail based on the following embodiments.

The equipment 60a in FIG. 1a determines the monitoring region 61a, which is relevant to the further evaluation with regard to the monitoring after nozzle adhesive substance residues. Thereby, the monitoring region can assume a free shape or geometrically known shapes, such as that of a circular ring or a rectangular ring. Thereby, the size of the mould (such as, for example, the diameter, length extension, etc.) may vary. This depends on the respective parameters and the geometry of the nozzle 30 used, which will still be explained later in more detail. The size of the minimum range of the monitoring region 61a can also be described relative to an overall region consisting of the monitoring region 61a and the process region. Thereby, the values for the minimum range of the monitoring region 61a of at least 20% relative to the minimum range of the overall region have emerged as being expedient.

The equipment 60b in FIG. 1a is used for the repeated detection of a surface region 61b of the monitoring region 61a. Thereby, the surface region 61b is detected where the intensity exceeds a specified minimum value 62. The detection itself takes place pixel by pixel due to the characteristics of the optical sensor chip 10 and comprises the size of the surface region 61*b*, which is evaluated after detection.

The equipment 60*c* in FIG. 1*a* is used to detect a time period 61*c*, during which the surface region 61*b* detected by the device 60*b* is greater than a specified minimum value 63. That means that, in addition to detecting the intensity and the region size, in the case of exceeding the intensity limit (specified minimum value) 62, the time the detected surface region 61*b* exists occurs if, in addition to the intensity limit (specified minimum value) 62, a limit 63 of the region size has also been exceeded. This is the third criterion for monitoring the image 61. The determination of the limit value 63 can also take place relative to the minimum range of the monitoring region 61*a*. Thereby, the values of a maximum of 10% relative the minimum range of the monitoring region 61*a* have emerged as being expedient.

The equipment 60*d* in FIG. 1 a serves to discontinue the deposition welding process if the time period 61*c* of the detected surface region 61*b* is greater than a specified time value 64. If the third criterion is also now exceeded in the case of monitoring the image 61, the danger is great that, in the case of the detected region 61*b*, it has to do with a greater adhesive substance residue on the molten material on the edge of the nozzle 30. Due to this, the process is stopped.

Another favorable embodiment of the device 100 for the process monitoring for a deposition welding method is shown in FIG. 2. Here, the material to be applied 31 is guided via the nozzle 30 focusing on the surface 51 of the workpiece 50 to be processed. By means of this, the focus of the material to be deposited 31 and the focus of the laser beam 21 can be brought together, which results in a particularly effective processing of the supplied material 31. By means of this, finer structures can be generated during cladding.

In addition, the device 100 for process monitoring in a deposition welding method can be favorably further developed, as is shown in FIG. 2, by means of the laser beam 21 being guided through a middle region of the nozzle 30 onto the surface 51 of the workpiece 50 to be processed. A very compact construction of the process head is possible by means of this, which is of an advantage in the case of regions of the workpiece 50 that are difficult to reach.

In FIG. 3, a diagram of an exemplary embodiment of a method according to the invention for process monitoring in a deposition welding method is shown. Thereby, in particular, the method steps of the evaluation unit 60 are shown.

At step S60*a*, a monitoring region 61*a* of the image 61 is determined. This monitoring region limits the image to the relevant range for the evaluation. Thereby, the values for the minimum range of the monitoring region 61*a* of at least 20% relative to the minimum range of the overall region, consisting of a monitoring region 61*a* and the process region, have emerged as being expedient.

At step S60*b*, a surface region 61*b* of the monitoring region 61*a* is detected again, in which the intensity exceeds a specified minimum value 62. With the monitoring region relevant to the evaluation, regions are searched for and these are detected, which exceed a previously determined intensity limit and the detection of their region size pixel by pixel is started.

At step S60*c*, a time period is detected, during which the detected surface region 61*b* is greater than a predetermined limit value 63. Now, in the case of detecting the region size pixel by pixel, it is observed if a region, which can be coherent and cumulated, exceeds a previously defined pixel limit value 63. As an alternative, the determination of the limit value 63 can also take place relative to the minimum range of the monitoring region. If this is the case, the time of this region exists is detected and the next step is started (S60*d*).

Step S60*d* discontinues the deposition welding process in the case, in which the time period of the detected surface region 61*b* is greater than a specified time value 64. If the detected time of the region, which exceeds the intensity limit (specified minimum value) 62 and the limit 63 of the size of the region, now also exceeds a time limit 64, the deposition welding process is discontinued since a greater adhesive substance residue of molten material to the edge of the nozzle 30 must be expected.

Thereby, for the selection of the time limit 64, a time period of preferably one second or of three seconds can be selected. Furthermore, in stochastic tests, a time period of five seconds has emerged as being particularly suitable since, in part, in the case of a process's time period being too short, the process was discontinued although the nozzle adhesive substance residue was just about to change in such a way that it would not have influenced the deposition welding process any more.

For determining the limit 63 of the size of the detected surface region 61*b*, depending on the geometry of the nozzle as well as the image scale and other factors, which are crucial for image processing, at least 10% relative to the minimum range of the monitoring region 61*a* has emerged as being expedient. Thereby, the different characteristics of the nozzle could be dealt with and the requirements of, for example, quality of the weld could be taken into account.

The invention claimed is:

1. A method (S100) for process monitoring in a deposition welding method under a use of an optical overall system with an optical detector (10), which is optically integrated within a beam path of a laser beam (21), and with a laser-beam source (20), which emits the laser beam (21) from the laser-beam source (20) in a directed manner to melt material (31) to be deposited, guides the laser beam (21) on to a workpiece (50) via an optical system (40), thereby focusing the laser beam (21) on to a surface (51) of the workpiece (50) to be processed, and the optical system (40) is set up to send a detector signal (11) depending on workpiece temperature and a nozzle geometry of a nozzle (30) in an direction opposing the laser beam (21) to the optical detector (10), which is captured by the optical detector (10) and converted into an electrical detector signal (12), and a conversion unit (70) configured to convert the electrical detector signal (12) into an image (61) that reproduces a temperature-dependent intensity distribution of the detector signal (11) captured by the optical detector (10), wherein the method comprises the following steps:

determining (S60*a*) a monitoring region (61*a*) of the image (61) that extends outwardly from a process region where the laser beam (21) hits the surface (51) of the workpiece (50) to melt the material (31), repeatedly detecting (S60*b*) a surface region (61*b*) of the monitoring region (61*a*) in which the temperature-dependent intensity distribution exceeds a specified minimum value (62), detecting (S60*c*) a time period (61*c*) during which a size of the detected surface region (61*b*), in which the temperature-dependent intensity distribution exceeds the specified minimum value (62), is greater than a specified limit value (63) of the size, and discontinuing (S60d) the deposition welding process if the time period (61c), during which the size of the detected surface region (61b) is greater than the predetermined limit value (63) of the size in which temperature-dependent intensity distribution that exceeds the predetermined minimum value (62), is greater than a specified time value (64).

2. The method (S100) according to claim 1, wherein a minimum size of the monitoring region (61a) is determined in such a way that the minimum size is at least 20% relative to an overall region predetermined by the nozzle geometry consisting of the monitoring region (61a) and a process region.

3. The method (S100) according to claim 2, wherein the specified limit value (63) of the detected surface region (61b) for the detection (S60c) of the time period (61c) is 10% relative to the size of the monitoring region (61a).

4. The method (S100) according to claim 1, wherein the step of discontinuing (S60d) the deposition welding process is performed in an automated manner.

5. The method (S100) according to claim 1, wherein the method further comprises the step:
guiding the material (31) to be deposited via the nozzle (30) focusing on the surface (51) of the workpiece (50) to be processed.

6. The method (S100) according to claim 5, wherein the method further comprises the step:
guiding the laser beam (21) through a middle region of the nozzle (30) to the surface (51) of the workpiece (50) to be processed.

7. The method (S100) according to claim 1, wherein the monitoring region (61a) is determined as an annular edge region around a process region.

8. The method (S100) according to claim 1, wherein the specified time value (64) is 1 second or 3 seconds or 5 seconds.

9. A method, comprising the steps of:
monitoring, with an optical detector, a monitored region that extends outwardly from a process region, where a laser beam hits a workpiece surface to melt material on the workpiece surface, during a deposition welding process; and
discontinuing the deposition welding process with an evaluation unit in response to the monitored region having, for a time period that is greater than a predetermined time value, a temperature-dependent intensity distribution that exceeds a predetermined minimum temperature-dependent intensity distribution value and a size that is greater than a predetermined size limit value.

10. The method according to claim 9, further comprising the steps of:
sending a detector signal, with an optical system, corresponding to workpiece temperature and nozzle geometry;
capturing the detector signal, detecting infrared wavelengths of the captured detector signal, and converting the captured detector signal into an electrical detector signal with the optical detector; and
converting the electrical detector signal into an image of the temperature-dependent intensity distribution with a conversion unit.

11. The method according to claim 9, wherein
the monitored region and the process region together define an overall region; and
the monitored region has a minimum size that is at 20% of the overall region.

12. The method according to claim 11, wherein
the predetermined size limit value is 10% of the monitored region minimum size.

13. The method according to claim 9, wherein
discontinuing the deposition welding process with the evaluation unit comprises automatically discontinuing the deposition welding process with the evaluation unit.

14. The method according to claim 9, further comprising the step of:
guiding the material deposited during the deposition welding process with a nozzle focused on the workpiece surface.

15. The method according to claim 14, wherein
the laser beam passes through a middle region of the nozzle to the workpiece surface.

16. The method according to claim 9, wherein
the monitored region comprises an annular edge region around the process region.

* * * * *